(12) United States Patent
Purdy

(10) Patent No.: US 8,874,574 B2
(45) Date of Patent: *Oct. 28, 2014

(54) INTELLIGENT DEFAULT WEIGHTING PROCESS FOR CRITERIA UTILIZED TO SCORE MEDIA CONTENT ITEMS

(75) Inventor: Sean Purdy, Durham, NC (US)

(73) Assignee: Abo Enterprises, LLC, Wilmington, DE (US)

( * ) Notice: Subject to any disclaimer, the term of this patent is extended or adjusted under 35 U.S.C. 154(b) by 38 days.

This patent is subject to a terminal disclaimer.

(21) Appl. No.: 13/549,598

(22) Filed: Jul. 16, 2012

(65) Prior Publication Data

US 2012/0278342 A1 Nov. 1, 2012

Related U.S. Application Data

(63) Continuation of application No. 11/944,962, filed on Nov. 26, 2007, now Pat. No. 8,224,856.

(51) Int. Cl.
*G06F 17/30* (2006.01)
*H04N 21/466* (2011.01)
*H04N 21/482* (2011.01)
*G11B 27/34* (2006.01)
*G11B 27/10* (2006.01)
*H04N 21/475* (2011.01)
*G11B 27/28* (2006.01)
*H04N 21/262* (2011.01)

(52) U.S. Cl.
CPC .... *G06F 17/30772* (2013.01); *G06F 17/30828* (2013.01); *H04N 21/4668* (2013.01); *H04N 21/4826* (2013.01); *G11B 27/34* (2013.01); *G11B 27/105* (2013.01); *G06F 17/3084* (2013.01); *G06F 17/30743* (2013.01); *G06F 17/30817* (2013.01); *H04N 21/4756* (2013.01); *G06F 17/30749* (2013.01); *G11B 27/28* (2013.01); *H04N 21/26258* (2013.01); *Y10S 707/916* (2013.01)
USPC ........... 707/736; 707/737; 707/740; 707/748; 707/749; 707/916

(58) Field of Classification Search
None
See application file for complete search history.

(56) References Cited

U.S. PATENT DOCUMENTS 5,581,704 A 12/1996 Barbara et al.
5,616,876 A 4/1997 Cluts (Continued)

FOREIGN PATENT DOCUMENTS

CN 1383328 12/2002
CN 1841385 10/2006

(Continued)

OTHER PUBLICATIONS

"Amazon.com: Online Shopping for Electronics, Apparel, Computers, Books, DVDs & m . . . ," at <http://www.amazon.com/>, copyright 1996-2007, Amazon.com, Inc., printed Oct. 26, 2007, 4 pages.

(Continued)

*Primary Examiner* — Anh Tai Tran

(57) ABSTRACT

A system and method are provided for intelligently, or programmatically, assigning weights for one or more criterion utilized to score media content items based on an analysis of a group of media content items. In general, scoring criteria to be used to score media content items for a user are defined. A group of media content items associated with the user is then analyzed with respect to the criteria to provide results such as a number or percentage of media content items from the group of media content items that satisfy each of the scoring criteria. Based on the results of the analysis, a weight is assigned to each of the scoring criteria. Thereafter, media content items are scored for the user as a function of the weights assigned to the scoring criteria.

28 Claims, 9 Drawing Sheets

(56) References Cited

U.S. PATENT DOCUMENTS

| | | | |
|---|---|---|---|
| 5,706,435 | A | 1/1998 | Barbara et al. |
| 5,754,939 | A | 5/1998 | Herz et al. |
| 5,758,347 | A | 5/1998 | Lo et al. |
| 5,857,207 | A | 1/1999 | Lo et al. |
| 5,870,764 | A | 2/1999 | Lo et al. |
| 5,890,152 | A | 3/1999 | Rapaport et al. |
| 5,918,223 | A | 6/1999 | Blum et al. |
| 6,192,340 | B1 | 2/2001 | Abecassis |
| 6,195,657 | B1 | 2/2001 | Rucker et al. |
| 6,201,176 | B1 | 3/2001 | Yourlo |
| 6,236,990 | B1 | 5/2001 | Geller et al. |
| 6,438,579 | B1 | 8/2002 | Hosken |
| 6,493,762 | B1 | 12/2002 | Chen et al. |
| 6,498,955 | B1 | 12/2002 | McCarthy et al. |
| 6,636,836 | B1 | 10/2003 | Pyo |
| 6,657,116 | B1 | 12/2003 | Gunnerson |
| 6,757,691 | B1 | 6/2004 | Welsh et al. |
| 6,785,688 | B2 | 8/2004 | Abajian et al. |
| 6,865,600 | B1 | 3/2005 | Brydon et al. |
| 6,933,433 | B1 | 8/2005 | Porteus et al. |
| 6,937,730 | B1 | 8/2005 | Buxton |
| 6,941,324 | B2 | 9/2005 | Plastina et al. |
| 7,000,188 | B1 | 2/2006 | Eustace |
| 7,028,082 | B1 | 4/2006 | Rosenberg et al. |
| 7,096,234 | B2 | 8/2006 | Plastina et al. |
| 7,096,486 | B1 | 8/2006 | Ukai et al. |
| 7,143,241 | B2 | 11/2006 | Hull |
| 7,146,627 | B1 | 12/2006 | Ismail et al. |
| 7,185,355 | B1 | 2/2007 | Ellis et al. |
| 7,200,852 | B1 | 4/2007 | Block |
| 7,233,948 | B1 | 6/2007 | Shamoon et al. |
| 7,283,992 | B2 | 10/2007 | Liu et al. |
| 7,296,285 | B1 | 11/2007 | Jun et al. |
| 7,321,923 | B1 | 1/2008 | Rosenberg et al. |
| 7,360,160 | B2 | 4/2008 | Matz |
| 7,403,787 | B2 | 7/2008 | Helferich |
| 7,496,623 | B2 | 2/2009 | Szeto et al. |
| 7,504,576 | B2 | 3/2009 | Georges |
| 7,529,743 | B1 | 5/2009 | Ershov |
| 7,567,525 | B2 | 7/2009 | Liao et al. |
| 7,570,943 | B2 | 8/2009 | Sorvari et al. |
| 7,580,932 | B2 | 8/2009 | Plastina et al. |
| 7,614,006 | B2 | 11/2009 | Molander |
| 7,680,959 | B2 | 3/2010 | Svendsen |
| 7,693,906 | B1 | 4/2010 | Amidon et al. |
| 7,720,871 | B2 | 5/2010 | Rogers et al. |
| 7,941,764 | B2 | 5/2011 | Svendsen et al. |
| 8,005,841 | B1 | 8/2011 | Walsh et al. |
| 8,059,646 | B2 | 11/2011 | Svendsen et al. |
| 2001/0021914 | A1 | 9/2001 | Jacobi et al. |
| 2001/0023401 | A1 | 9/2001 | Weishut et al. |
| 2002/0002483 | A1 | 1/2002 | Siegel et al. |
| 2002/0002899 | A1 | 1/2002 | Gjerdingen et al. |
| 2002/0019858 | A1 | 2/2002 | Kaiser et al. |
| 2002/0037083 | A1 | 3/2002 | Weare et al. |
| 2002/0052873 | A1 | 5/2002 | Delgado et al. |
| 2002/0073167 | A1 | 6/2002 | Powell et al. |
| 2002/0082901 | A1 | 6/2002 | Dunning et al. |
| 2002/0087565 | A1 | 7/2002 | Hoekman et al. |
| 2002/0099697 | A1 | 7/2002 | Jensen-Grey |
| 2002/0103796 | A1 | 8/2002 | Hartley |
| 2002/0129168 | A1 | 9/2002 | Kanai et al. |
| 2002/0138630 | A1 | 9/2002 | Solomon et al. |
| 2002/0157096 | A1 | 10/2002 | Hane et al. |
| 2002/0194285 | A1 | 12/2002 | Mousseau et al. |
| 2002/0199194 | A1 | 12/2002 | Ali |
| 2003/0005047 | A1 | 1/2003 | Seki et al. |
| 2003/0014407 | A1 | 1/2003 | Blatter et al. |
| 2003/0033347 | A1 | 2/2003 | Bolle et al. |
| 2003/0037036 | A1* | 2/2003 | Weare ............... 707/1 |
| 2003/0045953 | A1 | 3/2003 | Weare |
| 2003/0045954 | A1 | 3/2003 | Weare et al. |
| 2003/0055516 | A1 | 3/2003 | Gang et al. |
| 2003/0055657 | A1 | 3/2003 | Yoshida et al. |
| 2003/0066068 | A1 | 4/2003 | Gutta et al. |
| 2003/0089218 | A1 | 5/2003 | Gang et al. |
| 2003/0110503 | A1 | 6/2003 | Perkes |
| 2003/0135513 | A1 | 7/2003 | Quinn et al. |
| 2003/0140123 | A1 | 7/2003 | Master et al. |
| 2003/0160770 | A1 | 8/2003 | Zimmerman |
| 2003/0191753 | A1 | 10/2003 | Hoch |
| 2003/0217055 | A1 | 11/2003 | Lee et al. |
| 2003/0233241 | A1 | 12/2003 | Marsh |
| 2003/0236582 | A1 | 12/2003 | Zamir et al. |
| 2004/0019608 | A1 | 1/2004 | Obrador |
| 2004/0030832 | A1 | 2/2004 | Squibbs |
| 2004/0033777 | A1* | 2/2004 | Farineau et al. ............ 455/3.02 |
| 2004/0078383 | A1 | 4/2004 | Mercer |
| 2004/0093466 | A1 | 5/2004 | Hull |
| 2004/0128286 | A1 | 7/2004 | Yasushi et al. |
| 2004/0139059 | A1 | 7/2004 | Conroy et al. |
| 2004/0158870 | A1 | 8/2004 | Paxton et al. |
| 2004/0160971 | A1 | 8/2004 | Krause et al. |
| 2004/0254911 | A1 | 12/2004 | Grasso et al. |
| 2005/0021420 | A1 | 1/2005 | Michelitsch et al. |
| 2005/0038819 | A1 | 2/2005 | Hicken et al. |
| 2005/0071221 | A1 | 3/2005 | Selby |
| 2005/0076056 | A1 | 4/2005 | Paalasmaa et al. |
| 2005/0108233 | A1 | 5/2005 | Metsatahti et al. |
| 2005/0120053 | A1 | 6/2005 | Watson |
| 2005/0158028 | A1 | 7/2005 | Koba |
| 2005/0177516 | A1 | 8/2005 | Vandewater et al. |
| 2005/0177568 | A1 | 8/2005 | Diamond et al. |
| 2005/0187943 | A1 | 8/2005 | Finke-Anlauff et al. |
| 2005/0192987 | A1 | 9/2005 | Marsh |
| 2005/0197961 | A1 | 9/2005 | Miller et al. |
| 2005/0234995 | A1 | 10/2005 | Plastina et al. |
| 2005/0240661 | A1 | 10/2005 | Heller et al. |
| 2005/0246740 | A1 | 11/2005 | Teraci et al. |
| 2005/0256756 | A1 | 11/2005 | Lam et al. |
| 2005/0267944 | A1 | 12/2005 | Little |
| 2005/0278364 | A1 | 12/2005 | Kamen |
| 2005/0278758 | A1 | 12/2005 | Bodleander |
| 2005/0283791 | A1 | 12/2005 | McCarthy et al. |
| 2006/0004923 | A1 | 1/2006 | Cohen et al. |
| 2006/0008256 | A1 | 1/2006 | Khedouri et al. |
| 2006/0010167 | A1 | 1/2006 | Grace et al. |
| 2006/0020538 | A1 | 1/2006 | Ram et al. |
| 2006/0020662 | A1 | 1/2006 | Robinson |
| 2006/0020962 | A1 | 1/2006 | Stark et al. |
| 2006/0026048 | A1 | 2/2006 | Kolawa et al. |
| 2006/0032363 | A1 | 2/2006 | Platt |
| 2006/0064721 | A1 | 3/2006 | Del Val et al. |
| 2006/0069769 | A1 | 3/2006 | Dacosta |
| 2006/0083119 | A1 | 4/2006 | Hayes |
| 2006/0100978 | A1 | 5/2006 | Heller et al. |
| 2006/0112082 | A1 | 5/2006 | Platt et al. |
| 2006/0117260 | A1 | 6/2006 | Sloo et al. |
| 2006/0129544 | A1 | 6/2006 | Yoon et al. |
| 2006/0167991 | A1 | 7/2006 | Heikes et al. |
| 2006/0173910 | A1 | 8/2006 | McLaughlin |
| 2006/0195512 | A1 | 8/2006 | Rogers et al. |
| 2006/0195514 | A1 | 8/2006 | Rogers et al. |
| 2006/0195789 | A1* | 8/2006 | Rogers et al. ................ 715/727 |
| 2006/0195790 | A1 | 8/2006 | Beaupre et al. |
| 2006/0218187 | A1 | 9/2006 | Plastina et al. |
| 2006/0224435 | A1 | 10/2006 | Male et al. |
| 2006/0230065 | A1 | 10/2006 | Plastina et al. |
| 2006/0240868 | A1 | 10/2006 | Kaplan et al. |
| 2006/0241901 | A1 | 10/2006 | Hanus et al. |
| 2006/0242178 | A1 | 10/2006 | Butterfield et al. |
| 2006/0242661 | A1 | 10/2006 | Bodlaender et al. |
| 2006/0254409 | A1 | 11/2006 | Withop |
| 2006/0271959 | A1 | 11/2006 | Jacoby et al. |
| 2006/0277098 | A1 | 12/2006 | Chung et al. |
| 2006/0288074 | A1 | 12/2006 | Rosenberg |
| 2007/0005795 | A1 | 1/2007 | Gonzalez |
| 2007/0011095 | A1 | 1/2007 | Vilcauskas et al. |
| 2007/0011150 | A1 | 1/2007 | Frank |
| 2007/0025194 | A1 | 2/2007 | Morse et al. |
| 2007/0033419 | A1 | 2/2007 | Kocher et al. |
| 2007/0053268 | A1 | 3/2007 | Crandall et al. |
| 2007/0078832 | A1 | 4/2007 | Ott, IV et al. |
| 2007/0078895 | A1 | 4/2007 | Hsieh et al. |

(56) References Cited

U.S. PATENT DOCUMENTS

| | | |
|---|---|---|
| 2007/0089057 A1 | 4/2007 | Kindig |
| 2007/0094215 A1 | 4/2007 | Toms et al. |
| 2007/0118802 A1 | 5/2007 | Gerace et al. |
| 2007/0124325 A1 | 5/2007 | Moore et al. |
| 2007/0130207 A1 | 6/2007 | Pate et al. |
| 2007/0152502 A1 | 7/2007 | Kinsey et al. |
| 2007/0157797 A1* | 7/2007 | Hashizume et al. ............ 84/609 |
| 2007/0162502 A1 | 7/2007 | Thomas et al. |
| 2007/0169148 A1 | 7/2007 | Oddo et al. |
| 2007/0208802 A1 | 9/2007 | Barman et al. |
| 2007/0220100 A1 | 9/2007 | Rosenberg |
| 2007/0255797 A1 | 11/2007 | Dunn et al. |
| 2007/0265979 A1 | 11/2007 | Hangartner |
| 2007/0266049 A1 | 11/2007 | Cohen et al. |
| 2007/0266402 A1 | 11/2007 | Pawlak et al. |
| 2007/0271287 A1 | 11/2007 | Acharya et al. |
| 2007/0282472 A1 | 12/2007 | Seldman |
| 2007/0288546 A1 | 12/2007 | Rosenberg |
| 2008/0005301 A1 | 1/2008 | Li et al. |
| 2008/0016205 A1 | 1/2008 | Svendsen |
| 2008/0040474 A1 | 2/2008 | Zuckerberg et al. |
| 2008/0052371 A1 | 2/2008 | Partovi et al. |
| 2008/0059422 A1 | 3/2008 | Tenni et al. |
| 2008/0059576 A1 | 3/2008 | Liu et al. |
| 2008/0062318 A1 | 3/2008 | Ellis et al. |
| 2008/0091771 A1 | 4/2008 | Allen et al. |
| 2008/0126191 A1 | 5/2008 | Schiavi |
| 2008/0133601 A1 | 6/2008 | Martin Cervera et al. |
| 2008/0134039 A1 | 6/2008 | Fischer et al. |
| 2008/0134053 A1 | 6/2008 | Fischer |
| 2008/0140717 A1 | 6/2008 | Rosenberg et al. |
| 2008/0141315 A1 | 6/2008 | Ogilvie |
| 2008/0147482 A1 | 6/2008 | Messing et al. |
| 2008/0147711 A1 | 6/2008 | Spiegelman et al. |
| 2008/0189295 A1 | 8/2008 | Khedouri et al. |
| 2008/0195657 A1 | 8/2008 | Naaman et al. |
| 2008/0201446 A1 | 8/2008 | Svendsen |
| 2008/0208823 A1 | 8/2008 | Hicken |
| 2008/0209482 A1 | 8/2008 | Meek et al. |
| 2008/0222546 A1 | 9/2008 | Mudd et al. |
| 2008/0243733 A1 | 10/2008 | Black |
| 2008/0250067 A1 | 10/2008 | Svendsen |
| 2008/0301118 A1 | 12/2008 | Chien et al. |
| 2008/0307316 A1 | 12/2008 | Askey |
| 2009/0006368 A1 | 1/2009 | Mei et al. |
| 2009/0006374 A1 | 1/2009 | Kim et al. |
| 2009/0042545 A1 | 2/2009 | Avital et al. |
| 2009/0046101 A1 | 2/2009 | Askey et al. |
| 2009/0049030 A1 | 2/2009 | Svendsen et al. |
| 2009/0049045 A1 | 2/2009 | Askey et al. |
| 2009/0055385 A1 | 2/2009 | Jeon et al. |
| 2009/0055396 A1 | 2/2009 | Svendsen et al. |
| 2009/0055467 A1 | 2/2009 | Petersen |
| 2009/0055759 A1 | 2/2009 | Svendsen |
| 2009/0076881 A1 | 3/2009 | Svendsen |
| 2009/0077499 A1 | 3/2009 | Svendsen et al. |
| 2009/0083116 A1 | 3/2009 | Svendsen |
| 2009/0083117 A1 | 3/2009 | Svendsen et al. |
| 2009/0083362 A1 | 3/2009 | Svendsen |
| 2009/0119328 A1 | 5/2009 | Raza et al. |
| 2009/0129671 A1 | 5/2009 | Hu et al. |
| 2009/0144325 A1 | 6/2009 | Chastagnol et al. |
| 2009/0144326 A1 | 6/2009 | Chastagnol et al. |
| 2009/0254572 A1 | 10/2009 | Redlich et al. |
| 2010/0005116 A1 | 1/2010 | Yoon et al. |
| 2010/0063975 A1 | 3/2010 | Hayes |
| 2012/0041902 A1 | 2/2012 | Svendsen et al. |
| 2012/0042245 A1 | 2/2012 | Askey et al. |

FOREIGN PATENT DOCUMENTS

| | | |
|---|---|---|
| EP | 1686497 | 8/2006 |
| EP | 1791130 | 5/2007 |
| WO | WO 01/77907 | 10/2001 |
| WO | WO 01/84353 | 11/2001 |
| WO | WO 02/21335 | 3/2002 |
| WO | WO 03/019560 | 3/2003 |
| WO | WO 2004/017178 | 2/2004 |
| WO | WO 2005/038666 | 4/2005 |
| WO | WO 2005/052814 | 6/2005 |
| WO | WO 2006/075032 | 7/2006 |
| WO | WO 2007/032003 | 3/2007 |
| WO | WO 2007/044389 | 4/2007 |
| WO | WO 2007/092781 | 8/2007 |

OTHER PUBLICATIONS

"AOL Music Now," at <http://web.archive.org/web/20060508184531/aol.musicnow.com/az/home.jhtml?_requesti . . . >, copyright 2006, AOL Music Now LLC, printed Nov. 16, 2007, 1 page.

"Apple—iPod + iTunes," at <http://www.apple.com/itunes/>, copyright 2007 by Paramount Pictures, printed Feb. 7, 2007, 2 pages.

"Apple—iPod classic," at <http://www.apple.com/ipodclassic/>, printed Oct. 26, 2007, 1 page.

"The Bridge Ratings Report—The Impact of Wireless Internet," Luce Performance Group, International, study from interviews conducted between Jul. 5, 2007 and Aug. 31, 2007, date of publication unknown, file obtained Dec. 13, 2007, 6 pages.

Mitchell, Bradley, "Cable Speed—How Fast is Cable Modem Internet?," at <http://www.compnetworking.about.com/od/internetaccessbestuses/f/cablespeed.htm>, copyright 2005, About, Inc., printed Feb. 24, 2010, 2 pages.

Abstract, Chinese Patent Publication No. 1383328A, published Dec. 4, 2002, "Method and System for Recommending Program," Chinese Patent Application No. 20021018177, filed Apr. 23, 2002, Applicant: NEC Corp, Inventors: Hidegi Hane and Shinichiro Kamei, obtained from http://www.espacenet.com, as the abstract to related US Patent Application Publication No. 2002/0157096 A1, 2 pages.

Abstract, Chinese Patent Publication No. 1841385A, published Oct. 4, 2006, "Method of supplying content data and playlist thereof," Chinese Patent Application No. 20061073372, filed Mar. 31, 2006, Applicant: Sony Corp, Inventor: Taken Miyajima Yasushi Yamashi, obtained from http://www.espacenet.com, 1 page.

"Developer News Archive," Audacity Wiki, page last modified on Sep. 10, 2008, contains information dating back to May 4, 2008,retrieved Jun. 4, 2009 from <http://audacityteam.org/wiki/index.php?title=Developer_News_Archive>, 10 pages.

"Goombah" Preview, at <http://www.goombah.com/preview.html>, printed Jan. 8, 2008, 5 pages.

Holzner, Steven, overview of book "Inside JavaScript," published Aug. 28, 2002, New Riders, website copyright 2009, Safari Books Online, 7 pages.

Abstract, Reddy, S. and Mascia, J., "Lifetrak: music in tune with your life," Proceedings of the 1st ACM International Workshop on Human-Centered Multimedia 2006 (HCM '06), Santa Barbara, California, pp. 25-34, ACM Press, New York, NY, 2006, found at <http://portal.acm.org/citation.cfm?id=1178745.1178754>, ACM Portal, printed Oct. 2, 2007, 3 pages.

"Motorola Phones Tools—Features—Motorola US," http://direct.motorola.com/ens/MPT/MPT_Feature.asp, copyright 2005-2007 Motorola inc., printed Nov. 16, 2007, 1 page.

"Music Downloads—Over 2 Million Songs—Try It Free—Yahoo! Music," http://music.yahoo.com/ymu/default.asp, copyright 2006 Yahoo! Inc., printed Feb. 7, 2007, 1 page.

Wang, J. and Reinders, M.J.T., "Music Recommender system for Wi-Fi Walkman," Number ICT—Jan. 2003 in the ICT Group Technical Report Series, Information & Communication Theory Group, Department of Mediamatics, Faculty of Electrical Engineering, Mathematics and Computer Science, Delft University of Technology, Delft, The Netherlands, 2003, 23 pages.

"Musicstrands.com—Because Music is Social," brochure, copyright 2006, MusicStrands, Inc., 2 pages.

"MyStrands Download," at <http://www.mystrands.com/overview.vm>, copyright 2003-2007, MediaStrands, Inc., printed Feb. 7, 2007, 3 pages.

(56) References Cited

OTHER PUBLICATIONS

"MyStrands Labs: Patent-pending Technologies," at <http://labs.mystrands.com/patents.html>, earliest description from Nov. 2004, printed Feb. 7, 2007, 5 pages.

Pouwelse et al., "P2P-based PVR Recommendation using Friends, Taste Buddies and Superpeers," Workshop: Beyond Personalization 2005, IUI 2005, Jan. 9, 2005, San Diego, California, 6 pages.

"Pandora Internet Radio—Find New Music, Listen to Free Web Radio," at <http://www.pandora.com/>, copyright 2005-2007, Pandora Media, Inc., printed Feb. 7, 2007, 1 page.

"Pandora Radio—Listen to Free Internet Radio, Find New Music—The Music Genome Project," at <http://www.pandora.com/mgp>, copyright 2005-2007, Pandora Media, Inc., printed Oct. 26, 2007, 1 page.

Xiong, Li and Liu, Ling, "PeerTrust: Supporting Reputation-Based Trust for Peer-to-Peer Electronic Communities," IEEE Transactions on Knowledge and Data Engineering, vol. 16, No. 7, Jul. 2004, copyright 2004, IEEE, 15 pages.

"Press Release: UGC Whitepaper released—eModeration," Feb. 22, 2007, at <http://www.emoderation.com/news/press-release-ugc-whitepaper-released>, copyright 2006-2009, eModeration, printed Apr. 28, 2009, 3 pages.

Hill et al., "Recommending and Evaluating Choices in a Virtual Community of Use," at <http://delivery.acm.org/10.1145/230000/223929/p1 . . . 1=GUIDE&dl=GUIDE&CFID=101371626&CFTOKEN=47493911>, Proceedings of CHI 1995, May 7-11, 1995, Denver, Colorado, printed Sep. 10, 2010, 15 pages.

"Review of Personalization Technologies: Collaborative Filtering vs. ChoiceStream's Attributized Bayesian Choice Modeling," Technology Brief, ChoiceStream, Feb. 4, 2004, found at <http://www.google.com/url?sa=t&rct=j&q=choicestream%20review%20of%20personalization&source=web&cd=1&ved=0CDcQFjAA&url=http%3A%2F%2Fwww.behavioraltargeting.info%2Fdownloadattachment.php%3Fald%3Dcf74d490a8b97edd535b4ccdbfd0df55%26articleld%3D31&ei=C2jeTr71AurZ0QGCgsGvBw&usg=AFQjCNEBLn7jJCDh-VYty3h79uFKGFBkRw>, 13 pages.

"Rhapsody—Full-length music, videos and more—FREE," http://www.rhapsody.com/welcome.html, copyright 2001-2007 Listen.com, printed Feb. 7, 2007, 1 page.

Lamantia, Joe, "Second Generation Tag Clouds," Feb. 23, 2006, at <http://www.joelamantia.conn/blog/archives/ideas/second_generation_tag_clouds.html>, copyright 2006, Joe Lamantia, printed Nov. 29, 2007, 19 pages.

Kaser, Owen et al., "Tag-Cloud Drawing: Algorithms for Cloud Visualization," WWW2007, May 8-12, 2007, Banff, Canada, available at <http://www2007.org/workshops/paper_12.pdf>, 10 pages.

"Welcome to Facebook!—Facebook," at <http://www.facebook.com/>, copyright 2008, Facebook, printed Jan. 9, 2008, 1 page.

"YouTube—Broadcast Yourself.," at <http://www.youtube.com/>, copyright 2007, YouTube, LLC, printed Oct. 26, 2007, 2 pages.

Kristen Nicole, "YouTube Remixer—Online Video Editing for YouTube," at <http://mashable.com/2007/06/16/youtube-remixer/>, dated Jun. 16, 2007, including a post that appears to be posted 2 years prior to Jun. 16, 2007 (Jun. 2005), printed Jan. 8, 2010, 4 pages.

\* cited by examiner

US 8,874,574 B2

INTELLIGENT DEFAULT WEIGHTING PROCESS FOR CRITERIA UTILIZED TO SCORE MEDIA CONTENT ITEMS

PRIORITY CLAIM

The present application is a continuation of U.S. patent application Ser. No. 11/944,962, filed Nov. 26, 2007, now U.S. Pat. No. 8,224,856. The disclosure of the parent application is incorporated herein by reference in its entirety.

FIELD OF THE INVENTION

The present invention relates to digital media content items and more particularly relates to assigning weights to criteria utilized in a process of scoring media content items for a user.

BACKGROUND OF THE INVENTION

In today's digital world, the number of digital media content items, such as songs and videos, is enormous. For example, Apple's iTunes® Store currently has a catalog of 6 million songs, 100,000 podcasts, 30,000 audiobooks, 600 TV shows, and 500 movies. Of course, not all of these media content items are of interest to any one user. As such, there is a need for a technique for identifying media content items of interest to a user. In a similar fashion, personal media collections stored on users' personal computers or portable media players have also become large. Thus, there is also a need for prioritizing media content items in a user's personal media collection.

SUMMARY OF THE INVENTION

The present invention relates to a technique for intelligently, or programmatically, assigning weights for one or more criterion used to score media content items based on an analysis of a group of media content items. The scores of the media content items may be used to, for example, prioritize media content items in a playlist, make recommendations to a user in an e-commerce system, or the like. In general, scoring criteria to be used to score media content items for a user are defined. A group of media content items associated with the user is then analyzed with respect to the criteria to provide results, such as a number or percentage of media content items from the group of media content items that satisfy each of the scoring criteria. The group of media content items analyzed may be, for example, a media collection of the user, one or more playlists created, owned, or acquired by the user, or a group of media content items otherwise defined by the user. Based on the results of the analysis, a weight is assigned to each of the scoring criteria. Thereafter, media content items are scored for the user as a function of the weights assigned to the scoring criteria.

In another embodiment, a number of criteria are defined. The criteria may be scoring criteria used to score media content items for a user or, alternatively, criteria to be used for analysis. A group of media content items associated with a user is then analyzed with respect to the criteria to provide results such as a number or percentage media content items from the group of media content items that satisfy each of the scoring criteria. The group of media content items analyzed may be, for example, a media collection of the user, one or more playlists created, owned, or acquired by the user, or a group of media content items otherwise defined by the user. The results of the analysis are presented to the associated user. The associated user is then enabled to take an action based on the results such as, for example, viewing a list of media content items from the group of media content items satisfying one or more select criteria from the criteria used for the analysis, re-classify one or more of the media content items from the group of media content items analyzed, or the like, or any combination thereof.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

Figure 7:
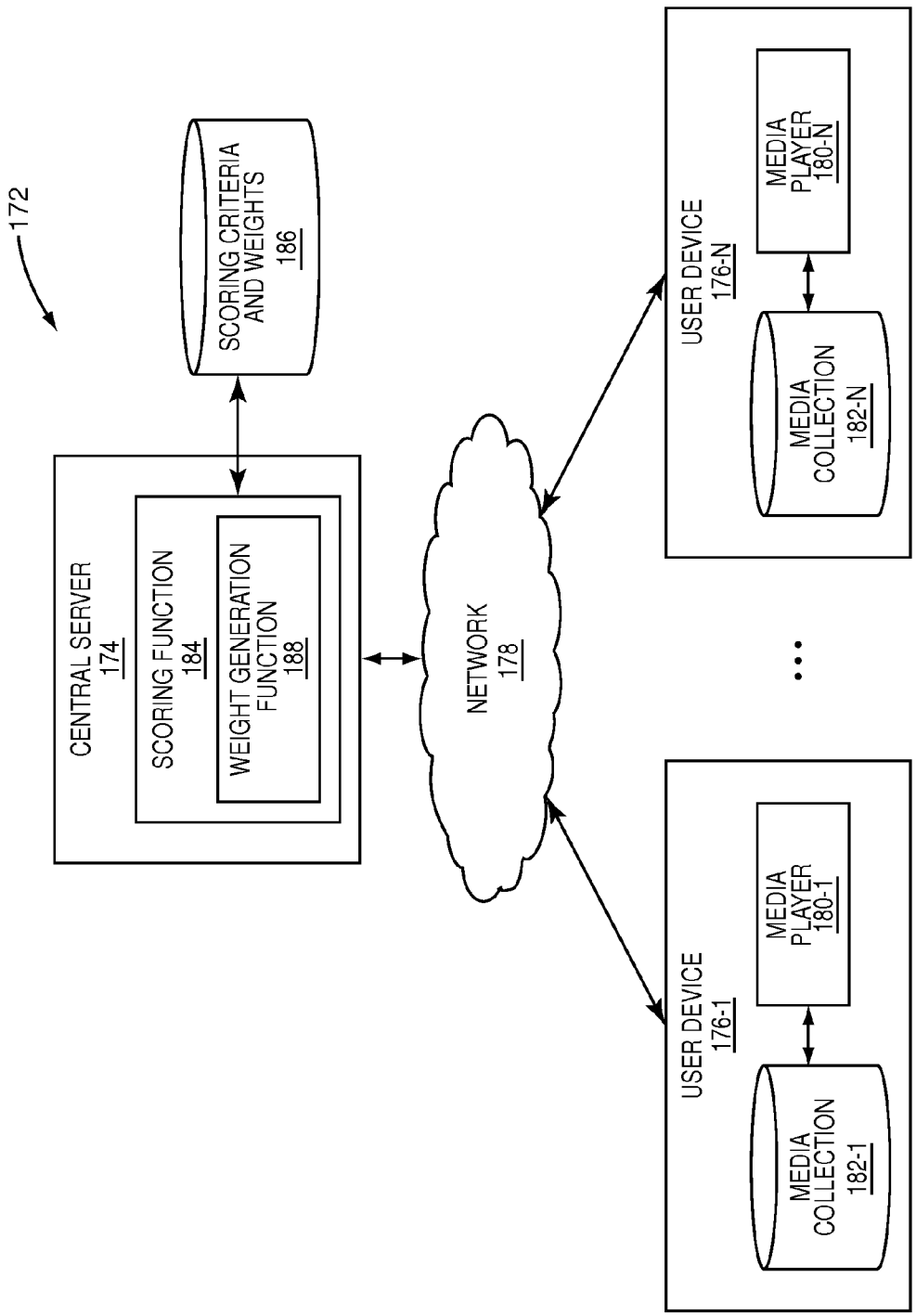
Figure 8:
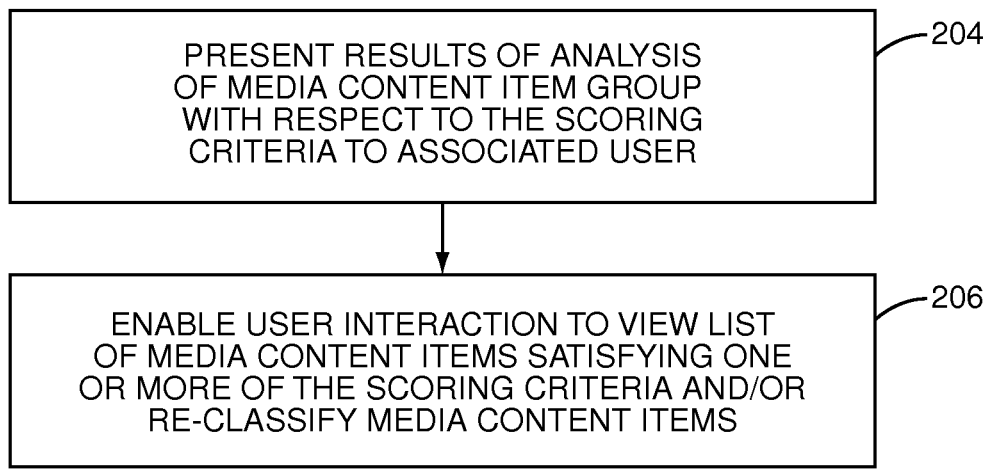
Figure 9:
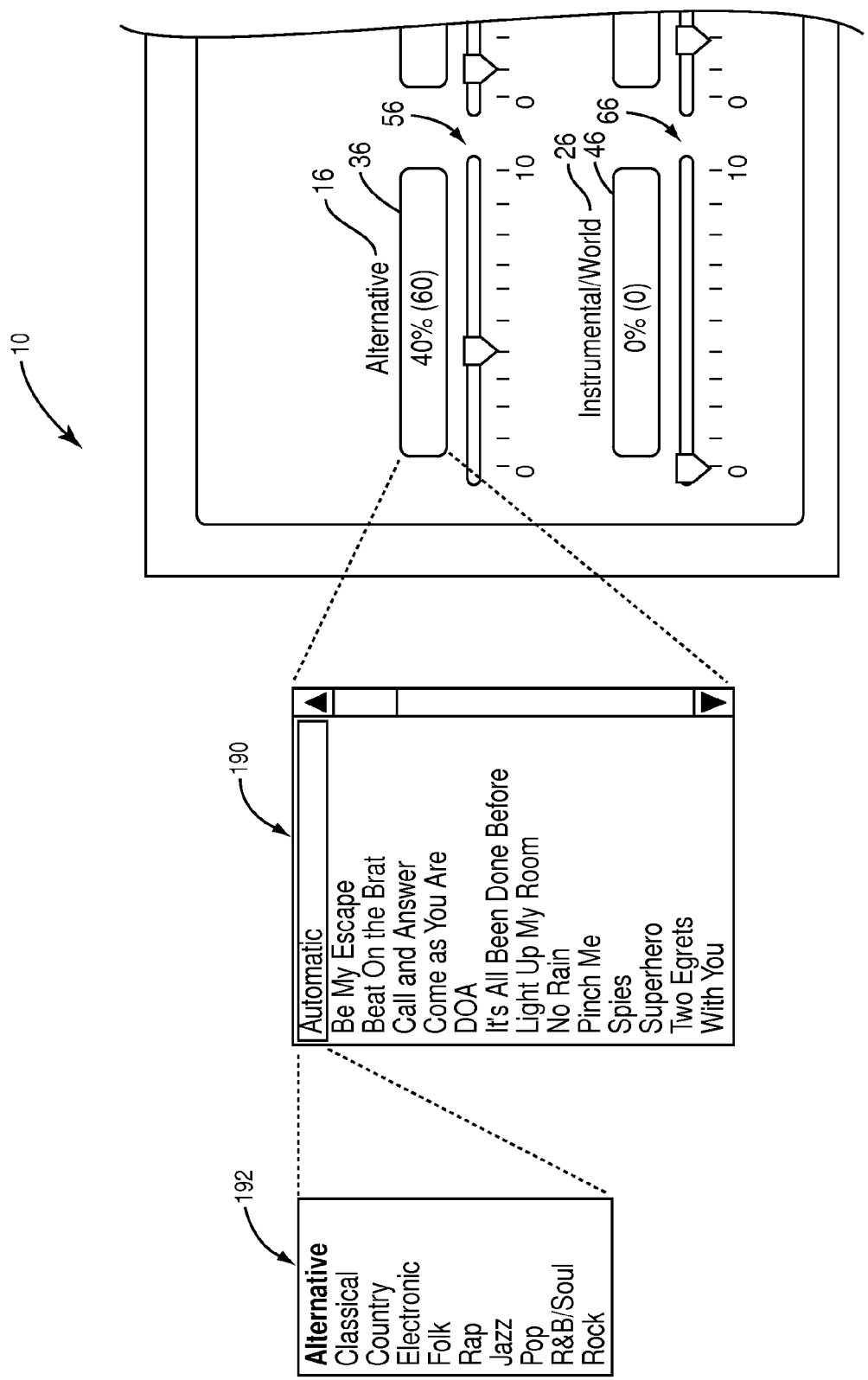

FIG. 7 illustrates a system including a central sever having a scoring function and weight assignment function according to one embodiment of the present invention; and FIGS. 8 and 9 are a flow chart and exemplary GUI for a process of presenting results of an analysis of a group of media content items to a user and enabling the user to initiate an action in response to the results according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention relates to intelligently, or programmatically, assigning weights for one or more criterion utilized to score media content items. Note that while a "score" is preferably a numerical value, a "score" may be any type of indicator of a degree of relevancy of a media content item to a user. The degree of relevancy may be the degree of similarity between a particular media content item and a user's preferences, likes, or dislikes.

Figure 1:
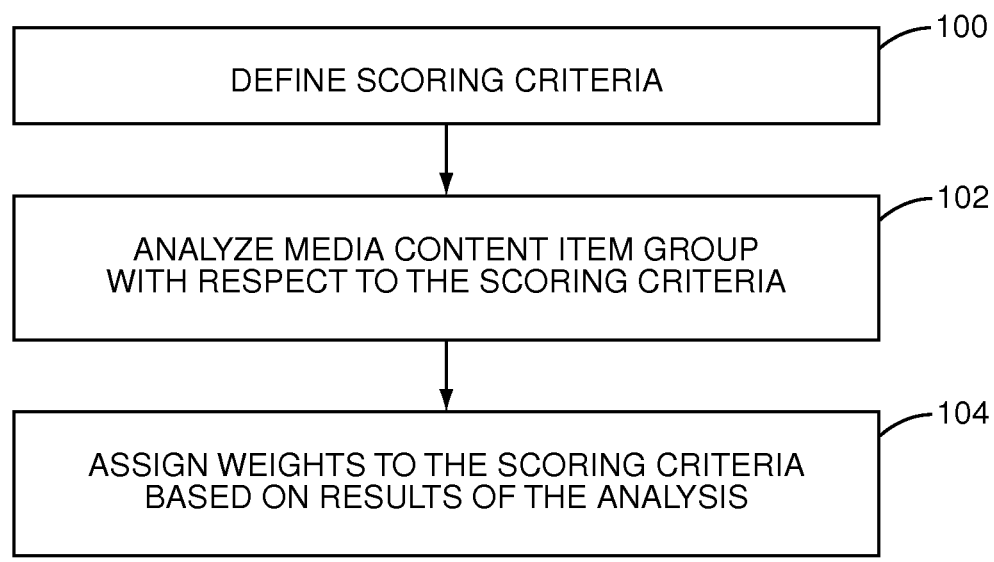
FIG. 1 is a flow chart illustrating a process for assigning weights to scoring criteria used to score media content items according to one embodiment of the present invention.

FIG. 1 is a flow chart illustrating a process for intelligently, or programmatically, assigning weights to scoring criteria to be used to score media content items according to one embodiment of the present invention. The media content items may be, for example, songs, music albums, videos such as movies, television programs, home movies, or video clips stored as digital video files, or the like, or any combination thereof. First, one or more scoring criterion is defined for scoring media content items for a user (step 100). Note that, while hereinafter referred to as "scoring criteria," it should be appreciated that there may be any number of one or more scoring criterion. The scoring criteria may be user-defined or system-defined. For example, the scoring criteria may include a number of music genres, music artists, video genres, actors or participants appearing in a video content item such as a movie or video clip, decades or other time periods of creation or release, or the like, or any combination thereof. The scoring criteria may additionally or alternatively include media categories, or groups, such as those described in commonly owned and assigned U.S. patent application Ser. No. 11/759,408 entitled SYSTEM AND METHOD FOR ASSIGNING USER PREFERENCE SETTINGS TO FIELDS IN A CATEGORY, PARTICULARLY A MEDIA CATEGORY, filed Jun. 7, 2007 and commonly owned and assigned U.S. patent application Ser. No. 11/944,949, entitled GROUPING AND WEIGHTING MEDIA CATEGORIES WITH TIME PERIODS, filed Nov. 26, 2007, both of which are hereby incorporated herein by reference in their entireties.

Next, a group of media content items is analyzed with respect to the scoring criteria (step 102). The group of media content items analyzed may be, for example, a media collection of the user, media content items identified by one or more playlists created, owned, or acquired by the user, or a group of media content items otherwise associated with the user, such as a subset of the user's media collection. In one embodiment, the group of media content items is analyzed to determine a number of media content items from the group or a percentage of media content items from the group satisfying each scoring criterion. For example, if the scoring criteria includes the Rock music genre, the Country music genre, and the Alternative music genre, the group of media content items may be analyzed to determine a number or percentage of the media content items from the group classified in the Rock music genre, a number or percentage of the media content items from the group classified in the Country music genre, and a number or percentage of the media content items from the group classified in the Alternative music genre.

Once the analysis is complete, weights are assigned to the scoring criteria based on the results of the analysis (step 104). More specifically, a weight is assigned to each scoring criterion. As used herein, weights may generally be any type of relative values. Preferably, the weights are numerical values. However, the weights may alternatively be other types of relative values such as, for example, "high," "medium," and "low," or the like. In one embodiment, the weights are assigned to the scoring criteria by directly translating the percentage of media content items satisfying each scoring criterion into a weight for that scoring criterion. As an example, assume that the scoring criteria are a number of music genres and the results of the analysis of step 102 are:

Alternative: 40% (60 items)
Classical: 5% (7 items)
Country/Folk: 5% (8 items)
Electronic: 30% (45 items)
Hip-Hop/Rap: 0% (0 items)
Instrumental/World: 0% (0 items)
Pop: 15% (22 items)
R&B/Soul: 0% (0 items)
Rock: 5% (7 items)
Vocal/Performance: 0% (0 items).

As such, the following weights may be assigned:
Alternative: 4
Classical: 1
Country/Folk: 1
Electronic: 3
Hip-Hop/Rap: 0
Instrumental/World: 0
Pop: 2
R&B/Soul: 0
Rock: 1
Vocal/Performance: 0.

Note that the weights have been rounded to the nearest whole number in this embodiment where applicable. For example, the weight assigned to the Classical music genre has been rounded up from 0.5 to 1.

Note that a default weight may be used for media content items not satisfying any of the scoring criteria. Where there is a direct translation between the percentage of media content items satisfying a scoring criterion and the weight assigned to that scoring criterion, the default weight may be scaled in order to prevent those media content items from being scored too highly. For example, the default weight may be one-half of the highest weight assigned to any of the scoring criteria.

In another embodiment, weights may be assigned to the scoring criteria by assigning a maximum weight to the scoring criteria having the greatest number of media content items or the greatest percentage of media content items from the group associated therewith. The weight for each of the remaining scoring criteria may then be determined as a function of a ratio of the number or percentage of media content items for the remaining scoring criteria to the number or percentage of media content items for the scoring criteria having been assigned the maximum weight. As an example, assume that the scoring criteria are a number of music genres and the results of the analysis of step 102 are:

Alternative: 40% (60 items)
Classical: 5% (7 items)
Country/Folk: 5% (8 items)
Electronic: 30% (45 items)
Hip-Hop/Rap: 0% (0 items)
Instrumental/World: 0% (0 items)
Pop: 15% (22 items)
R&B/Soul: 0% (0 items)
Rock: 5% (7 items)
Vocal/Performance: 0% (0 items).

As such, the following weights may be assigned:
Alternative: 10
Classical: 1
Country/Folk: 1
Electronic: 8
Hip-Hop/Rap: 0
Instrumental/World: 0
Pop: 4
R&B/Soul: 0
Rock: 1
Vocal/Performance: 0.

In this example, the weight (weight$_{CRITERION}$) assigned to the music genres has been computed as:

$$weight_{CRITERION} = round\left(\frac{\frac{number\_of\_media\_content\_items_{CRITERION}}{number\_of\_media\_content\_items_{MAX}} \cdot 100}{10}\right),$$

where number_of_media_content_items$_{CRITERION}$ is the number of media content items satisfying the scoring criterion and number_of_media_content_items$_{MAX}$ is the number of media content items satisfying the scoring criterion having the greatest number or percentage of media content items. The "round" function rounds to the nearest whole number. Thus, for example, the weight for the Classical music genre has been computed as:

$$weight_{CLASSICAL} = round\left(\frac{\frac{number\_of\_media\_content\_items_{CLASSICAL}}{number\_of\_media\_content\_items_{ALTERNATIVE}} \cdot 100}{10}\right)$$

$$weight_{CLASSICAL} = round\left(\frac{\frac{7}{60} \cdot 100}{10}\right) = 1.$$

Figure 2:
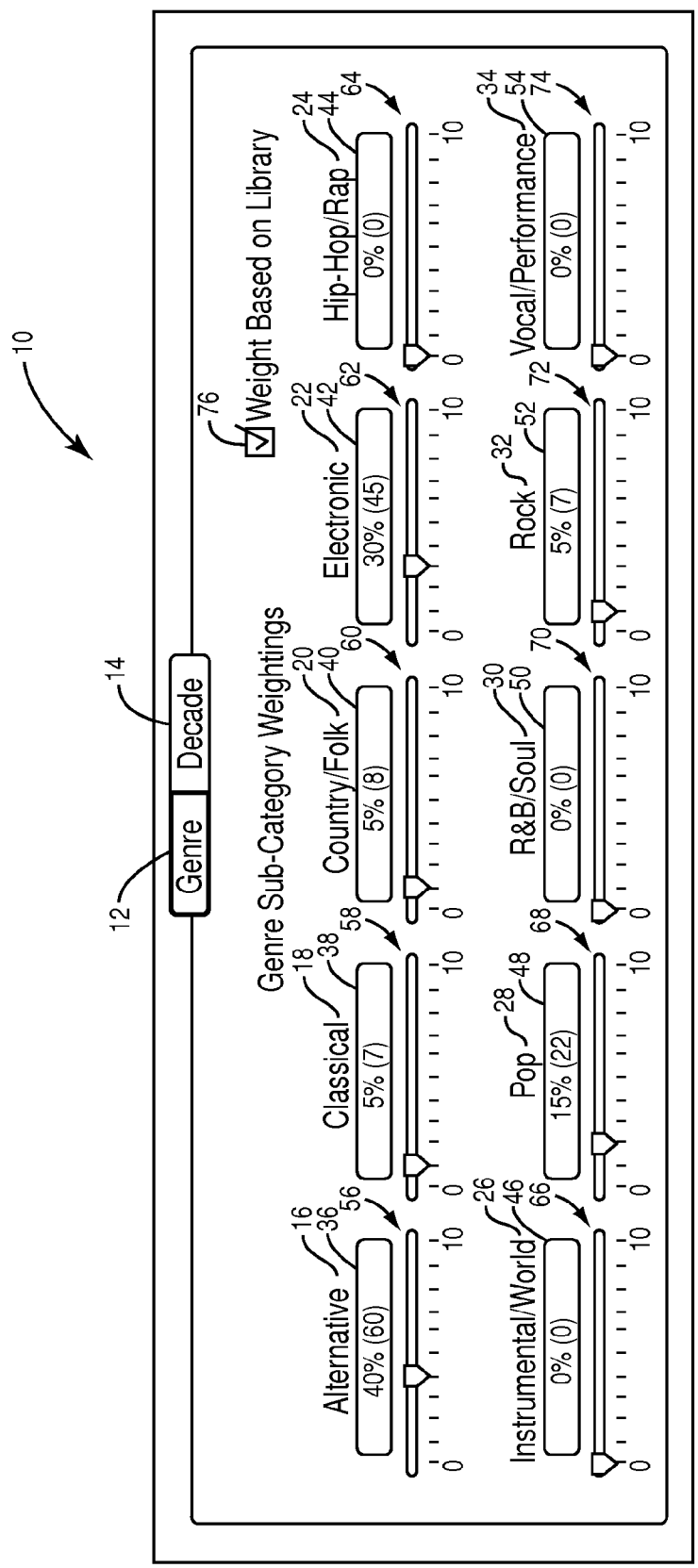
FIGS. 2 and 3 illustrate an exemplary Graphical User Interface (GUI) for presenting the scoring criteria, results of an analysis used to assign the weights for the scoring criteria, and the weights assigned to the scoring criteria to a user and enabling the user to manually adjust the weights assigned to the scoring criteria according to one embodiment of the present invention.
Figure 3:
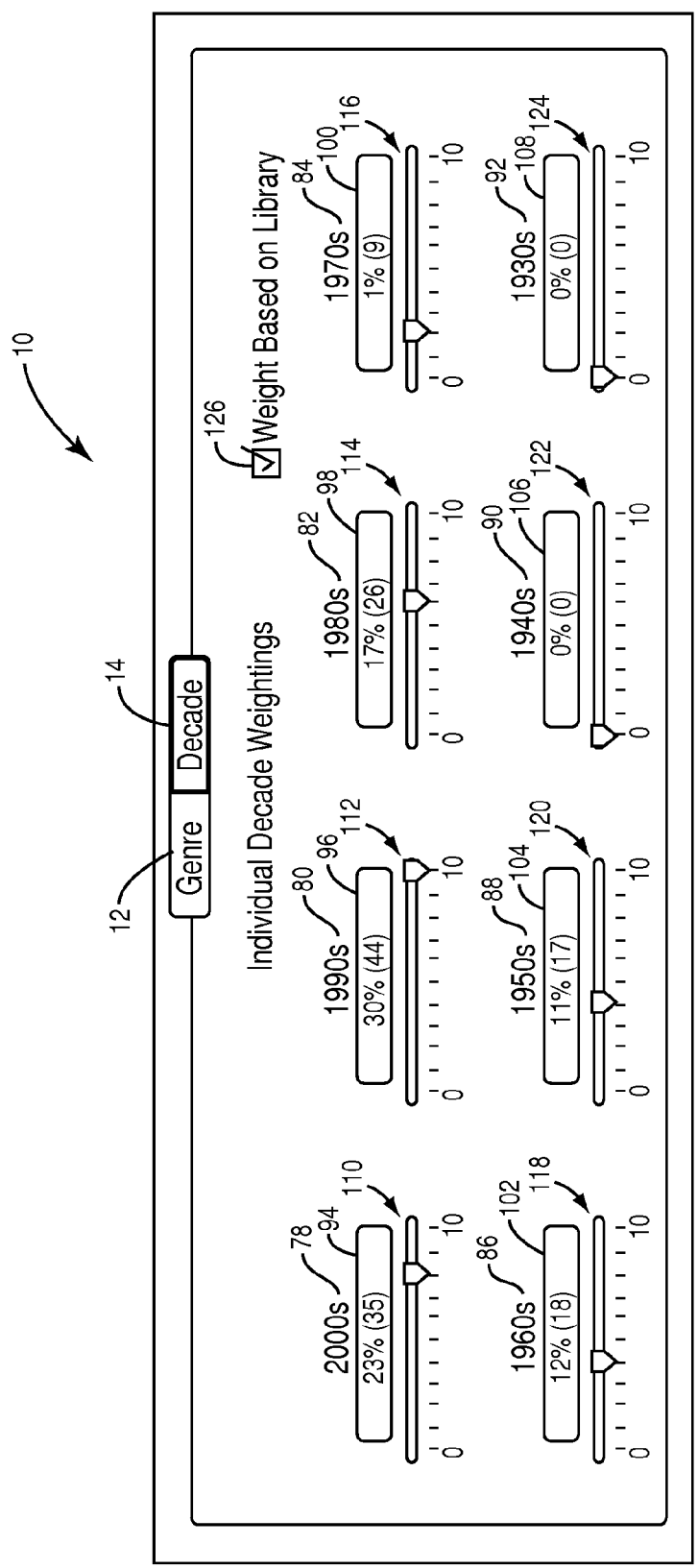

FIGS. 2 and 3 illustrate an exemplary Graphical User Interface (GUI) for presenting the results of the analysis of step 102 of FIG. 1 to the user for exemplary scoring criteria and enabling the user to manually adjust the programmatically assigned weights according to one embodiment of the present invention. More specifically, FIGS. 2 and 3 illustrate an exemplary GUI 10 including a genre tab 12 and a decade tab 14. The genre tab 12 enables the user to view genre related scoring criteria and, optionally, adjust the weights assigned to the genre related scoring criteria when selected. The decade tab 14 enables the user to view decade related scoring criteria and, optionally, adjust the weights assigned to the decade related scoring criteria when selected.

FIG. 2 illustrates the GUI 10 when the genre tab 12 is selected. As illustrated, the genre related scoring criteria includes a number of music genres 16-34. The results of the analysis of step 102 of FIG. 1 are presented in blocks 36-54 associated with the music genres 16-34. The blocks 36-54 may be display windows or, as discussed below, buttons or other selection means enabling the user to take some action. Sliding bars 56-74 define the weights assigned to the music genres 16-34. Initially, the weights, and thus the sliding bars 56-74, are set to the weights assigned to the music genres 16-34 based on the analysis of the group of media content items. The user may then manually adjust the weights by adjusting the sliding bars 56-74. Thus, the weights assigned based on the analysis of the group of media content items may serve as intelligent default weights for the music genres 16-34. Note that the sliding bars 56-74 are exemplary. Any other user interaction means such as, for example, a pull down menu or text field may be alternatively used.

In this example, the GUI 10 also includes a field 76 enabling the user to select whether weights are or are not to be programmatically assigned to the music genres 16-34 based on an analysis of the user's music collection, or library. As discussed above, the user's music collection is only one example of a media content item group. Other groups may be, for example, media content items identified by one or more playlists created or otherwise acquired by the user, media content items identified by the user such as a subset of the user's media collection, or the like, or any combination thereof.

FIG. 3 illustrates the GUI 10 when the decade tab 14 is selected. As illustrated, the decade related scoring criteria includes a number of decades 78-92. The results of the analysis of step 102 of FIG. 1 for the decades 78-92 are presented in blocks 94-108 associated with the decades 78-92. The blocks 94-108 may be display windows or, as discussed below, buttons or other selection means enabling the user to take some action. Sliding bars 110-124 define the weights assigned to the decades 78-92. Initially, the weights, and thus the sliding bars 110-124, are set to the weights assigned to the decades 78-92 based on the analysis of the group of media content items. The user may then manually adjust the weights by adjusting the sliding bars 110-124. Thus, the weights assigned based on the analysis of the group of media content items may serve as intelligent default weights for the decades 78-92. Again, note that the sliding bars 110-124 are exemplary. Any other user interaction means such as, for example, a pull down menu or text field may be alternatively used.

In this example, the GUI 10 also includes a field 126 enabling the user to select whether weights are or are not to be programmatically assigned to the decades 78-92 based on an analysis of the user's music collection, or library. As discussed above, the user's music collection is only one example of a media content item group. Other groups may be, for example, media content items identified by one or more playlists created or otherwise acquired by the user, media content items identified by the user such as a subset of the user's media collection, or the like, or any combination thereof.

Figure 4:
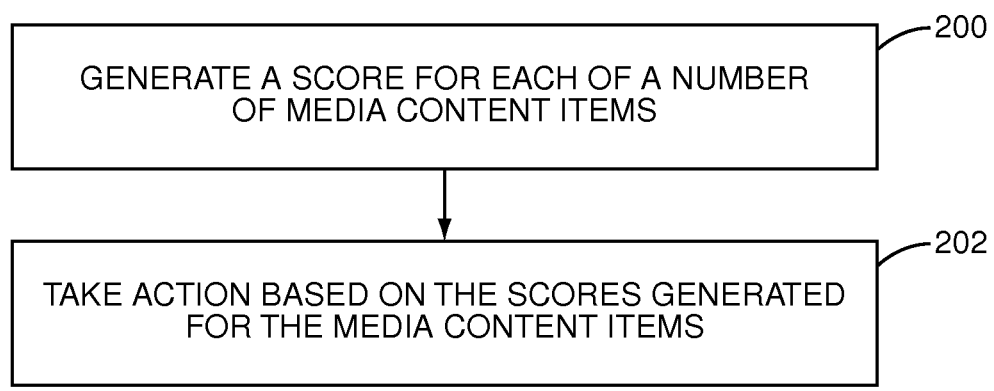
FIG. 4 illustrates a process for scoring media content items as a function of the weights assigned to the scoring criteria and taking an action based on the scores according to one embodiment of the present invention.

FIG. 4 illustrates a process of scoring media content items as a function of the weights assigned to the scoring criteria and taking an action based on the scores according to one embodiment of the present invention. First, a score is generated for each of number of media content items (step 200). One or more media content items may be scored. The media content items scored may be the media content items in the user's media collection, the media content items in one or more playlists of the user, the media content items identified by recommendations provided by a social recommendation system or network, media content items that may potentially be recommended to the user via a media distribution service, or the like.

More specifically, for each media content item to be scored, metadata or information describing the media content item is compared to the scoring criteria in order to identify one or more scoring criterion that are satisfied by the media content item. For example, for a song, the metadata may include information such as a music genre for the song, an artist of the song, an album on which the song was released, a date of release of the song, and the like. Thus, if the scoring criteria includes a number of genres and decades of release, the music genre of the song and the decade in which the song was released may be identified as scoring criteria that are satisfied by the song. The metadata describing the media content item may be stored in and thus obtained from the headers of the same digital file, an associated application file or database, a remote server, or the like. Once the satisfied scoring criteria are identified, the media content item is scored as a function of the weights assigned to the satisfied scoring criteria. Thus, returning to the example, the score for the song may be generated as a function of the weights assigned to the corresponding music genre and decade. For example, the score may be a product or sum of the weights assigned to the corresponding music genre and decade.

Once the media content items are scored, an action may be taken based on the scores of the media content items (step 202). The action taken depends on the implementation. For example, the scores may be utilized to prioritize or sort songs in a playlist, generate a playlist, prioritize media content items identified by recommendations received in a social recommendation system or network, identify recommendations for the user, or the like. Further, the scoring process may be implemented on any type of computing system such as, for example, a server hosting a music distribution service, a user device, or the like. For example, a music distribution service such as, for example, Apple's iTunes® Store may score songs, movies, and/or television shows as discussed above and recommend those having a score above some threshold level to the associated user. As another example, a number of songs in a user's music collection may be scored using the scoring process described above. Playback of the songs may then be prioritized, and optionally automatically effected, based on the scores of the songs. In addition or alternatively, one or more playlists may be generated based on the scores of the songs.

As a final example, the scoring process discussed herein may be used in a social recommendation system such as that disclosed in commonly owned and assigned U.S. patent application Ser. No. 11/484,130, entitled P2P NETWORK FOR PROVIDING REAL TIME MEDIA RECOMMENDATIONS, which was filed on Jul. 11, 2006 and is hereby incorporated herein by reference in its entirety. In this social recommendation system, when a first peer device plays a media content item, it sends a recommendation identifying that media content item to one or more associated peer devices via a peer-to-peer (P2P) network. Likewise, as each of the associated peer devices play media content items, they send recommendations identifying those media content items to the first peer device. In response to receiving recommendations from the associated peer devices, the first peer device may score the recommended media content items and, optionally, locally stored media content items as discussed herein. Playback of the recommended media content items and, optionally, the locally stored media content items may then be programmatically, or automatically, effected based on the scores. Note that the P2P network may be established over a Local Area Network (LAN), a Wide Area Network (WAN), or a combination thereof. Further, when established via a WAN, the recommendations may be exchanged via a central server.

Figure 5:
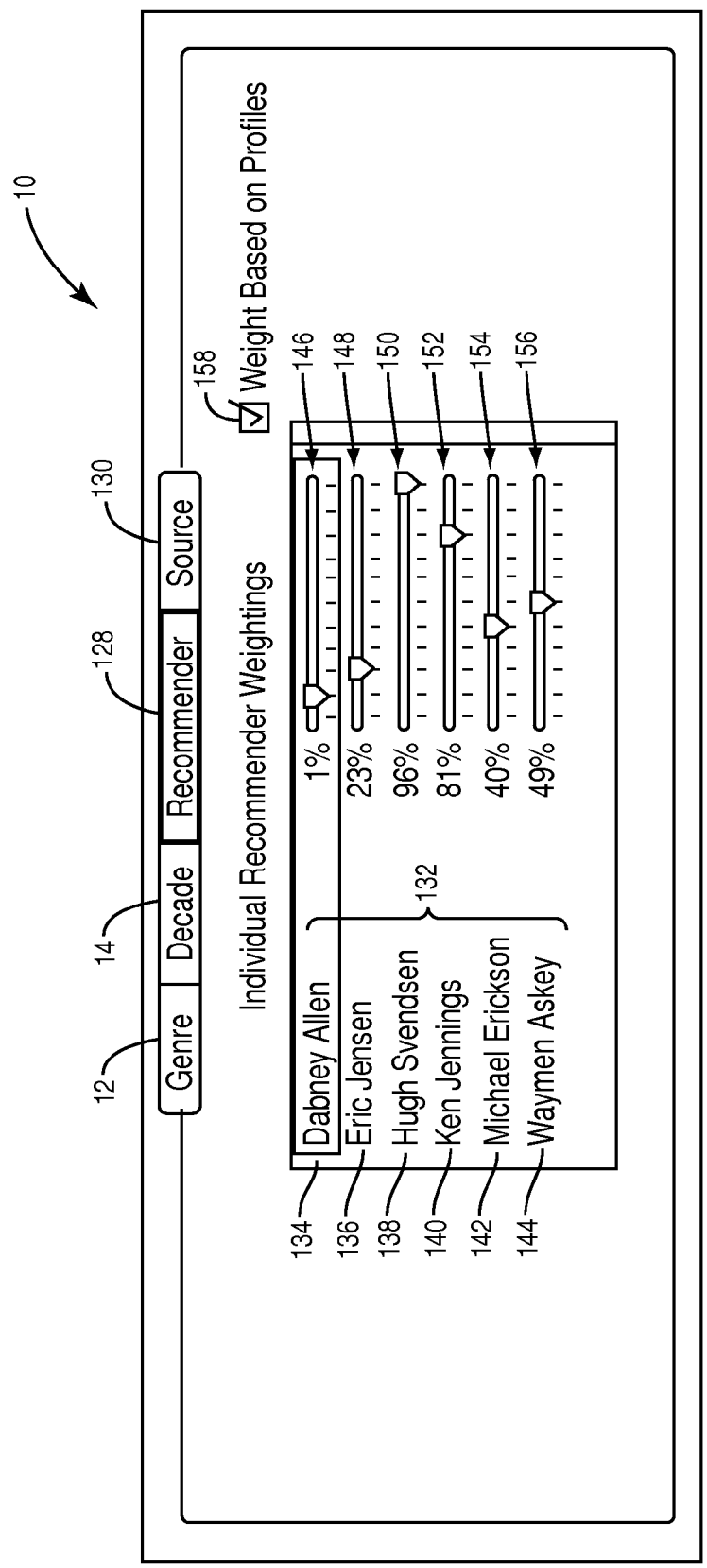
FIG. 5 is another illustration of the GUI of FIGS. 2 and 3 further presenting a list of recommenders in a social recommendation network and weights assigned to the recommenders and enabling the user to manually adjust the weights assigned to the recommenders according to one embodiment of the present invention.

It should be noted that the scoring criteria discussed above may or may not be the only criteria used for the scoring process. Additional criteria may be used such that media content items are scored based on the scoring criteria and the weights assigned to the scoring criteria discussed above as well as additional criterion and their associated weights. As an example, in a social recommendation system, such as the one described in commonly owned and assigned U.S. patent application Ser. No. 11/484,130, it may be desirable to score recommended media content items based scoring criteria such as genre and decade as well as recommender and source. FIG. 5 illustrates the GUI 10 further including a recommender tab 128 and a source tab 130 that may be utilized in such a recommendation system. In this illustration, the recommender tab 128 is selected. As such, a recommender list 132 is presented. The recommender list 132 includes a listing of recommenders 134-144. The recommenders 134-144 may be all recommenders in the user's social network, which are other users from which recommendations are received. Alternatively, the recommenders 134-144 may be recommenders, or other users, from which recommendations have been received in the past. Weights assigned to the recommenders 134-144 may be manually adjusted by the user via sliding bars 146-156. Note that the sliding bars 146-156 are exemplary. Other types of user input means may be utilized.

The GUI 10 also includes a field 158 enabling the user to select whether weights are to be programmatically, or automatically, assigned to the recommenders 134-144. Again, if the weights are programmatically assigned, they may thereafter be adjusted by the user by utilizing the sliding bars 146-156. In one embodiment, weights are programmatically assigned to the recommenders 134-144 based on a degree of similarity between a user profile of the user and user profiles of the recommenders 134-144. Note that the user profiles may be stored in a central database associated with the social recommendation system, exchanged among the peer devices in the social recommendation system as needed, or the like. The user profiles may include, for example, favorite music genre(s), favorite music artist(s), favorite decade(s), favorite video genre(s), favorite actor(s) or actress(es), or the like, or any combination thereof. In addition or alternatively, the user profiles may include demographic information and/or biographical information describing the users.

The degree of similarity between two user profiles may be determined using any desired scheme. For example, if the user profiles include a favorite music genre, a favorite music artist, a favorite decade, age, and home address, the degree of similarity may be determined as a function of a ratio of a number of matching parameters to a total number of parameters in the user profiles. So, if two users have the same favorite music genre, the same music artist, and the same favorite decade and are of the same age group but live in different geographical areas, the degree of similarity may be ⅘, or 80%.

As one exemplary alternative embodiment, the weights assigned to the recommenders 134-144 may be assigned based on the user's media collection. More specifically, the weight assigned to a particular recommender may be determined as a function of a total number of media content items recommended by that recommender as compared to a number of those recommended media content items that have been purchased or otherwise obtained by the user in response to the recommendations from the recommender, played by the user in response to the recommendations from the recommender, scored above a defined threshold, or the like, or any combination thereof.

While not illustrated, the source tab 130 enables the user to assign weights to each of a number of potential sources for media content items to be scored. For example, the potential sources may be, for example, "local," "subscription network," "buy/download," or "find." "Local" means that the media content item, or recommended media content item, is included in the user's local media collection. "Subscription" means that the media content item is available via a subscription-based media distribution service, such as Yahoo! Unlimited, to which the user has a subscription. "Buy/download" means that the media content item is available for purchase and download from a media distribution service such as, for example, the iTunes® Store. Lastly, "find" means that the media content item is not part of the user's local media collection, not available via any subscription-based media service to which the user is registered, and not available for purchase or download from any media distribution service with which the user is registered. In this case, a search of other media distribution services, the Internet, or the like may be performed in an attempt to locate the media content item. Weights may be assigned to each of the potential sources manually by the user.

Figure 6:
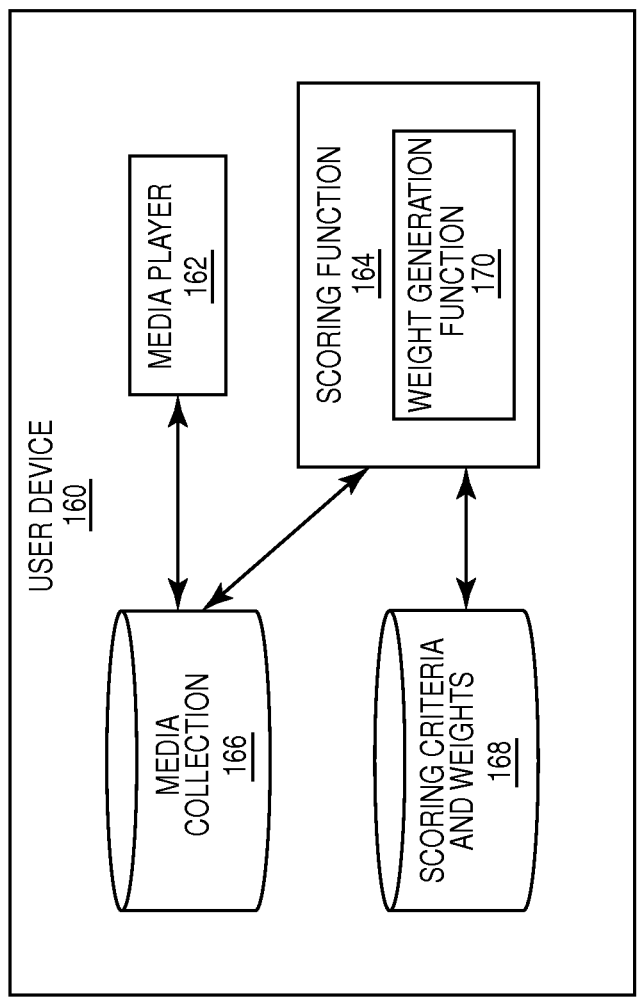
FIG. 6 is a functional block diagram of a user device incorporating a scoring function and a weight assignment function according to one embodiment of the present invention.

FIG. 6 is a functional block diagram of an exemplary user device 160 that operates according to one embodiment of the present invention. The user device 160 may be, for example, a personal computer, a portable media player, a set-top box, a gaming console, or the like. The user device 160 generally includes a media player 162 and a scoring function 164, each of which may be implemented in software, hardware, or a combination thereof. The media player 162 enables playback of media content items in a media collection 166 of an associated user. The scoring function 164 operates to score media content items as a function of scoring criteria and weights assigned to the scoring criteria, which are referred to collectively as scoring criteria and weights 168. The media content items scored by the scoring function 164 may be the media content items in the media collection 166 of the user, media content items in one or more playlists created or otherwise acquired by the user, a subset of the media collection 166, media content items identified by recommendations received by or to be provided to the user device 160 as part of a social recommendation system, or the like, or any combination thereof.

In this embodiment, the scoring function 164 includes a weight generation function 170. However, the weight generation function 170 may alternatively be a separate function. The weight generation function 170 operates to programmatically assign the weights to the scoring criteria in the manner discussed above. More specifically, the weight generation function 170 operates to assign the weights to the scoring criteria based on an analysis of the media collection 166, one or more playlists created by or acquired by the associated user, a number of media content items identified by the user such as a subset of the media collection 166, or the like.

FIG. 7 illustrates a system 172 wherein weights are assigned and media content items are scored at a central server 174 according to another embodiment of the present invention. In general, the system 172 includes the central server 174 and a number of user devices 176-1 through 176-N communicatively coupled via a network 178. The network 178 may be any type of WAN or LAN or any combination thereof. The user devices 176-1 through 176-N include media players 180-1 through 180-N, respectively. The media players 180-1 through 180-N may be implemented in software, hardware, or a combination thereof and operate to provide playback of media content items from associated media collections 182-1 through 182-N of associated users.

The central server 174 includes a scoring function 184, which is preferably implemented in software. However, the present invention is not limited thereto. The scoring function 184 operates to score media content items for the users associated with the user devices 176-1 through 176-N as a function of scoring criteria and weights assigned to the scoring criteria for each of the users, which are referred to collectively as scoring criteria and weights 186. While the scoring criteria may or may not be the same for each of the users, the weights for the scoring criteria are assigned separately for each of the users.

In this embodiment, the scoring function 184 includes a weight generation function 188. However, the weight generation function 188 may alternatively be a separate function. The weight generation function 188 operates to programmatically assign the weights to the scoring criteria for each of the users in the manner discussed above. More specifically, for each user, the weight generation function 188 operates to assign the weights to the scoring criteria for that user based on an analysis of a group of media content items associated with that user. The group of media content items may be, for example, the media collection 182-1, 182-N of that user, one or more playlists created by or acquired by that user, a number of media content items identified by that user such as a subset of the media collection 182-1, 182-N of that user, or the like.

The scoring function 184 may score various media content items depending on the particular implementation. In one embodiment, the scoring function 184 operates to score the media content items in the media collections 182-1 through 182-N of the users, media content items in one or more playlists created or otherwise acquired by the users, subsets of the media collections 182-1 through 182-N of the users, or the like. In order to enable the scoring, the user devices 176-1 through 176-N may provide information identifying the media content items to be scored and, optionally, metadata describing those media content items to the central server 174. Note that the central server 174 may store or otherwise have access to metadata describing the media content items, in which case only information identifying the media content items to be scored needs to be provided from the user devices 176-1 through 176-N to the central server 174.

In addition or alternatively, the scoring function 184 may score media content items identified by recommendations received by or to be provided to the user devices 176-1 though 176-N as part of a social recommendation system. Note that, in one embodiment, the user devices 176-1 through 176-N may be part of a social recommendation system, and the central server 174 may provide a proxy function for communicating recommendations between the user devices 176-1 through 176-N. In this case, the scoring function 184 may score the recommendations prior to sending the recommendations to their destinations.

In another embodiment, the central server 174 may be part of a media distribution service. In this embodiment, the weights for the scoring criteria may additionally or alternatively be determined based on an analysis of media content items previously downloaded and/or purchased by the users of the user devices 176-1 through 176-N from the music distribution service. The scoring function 184 may score media content items available from the media distribution service in order to make recommendations to the users. More specifically, for each user, the available media content items, or some subset thereof, are scored based on the scoring criteria and weights for the user. The music distribution service may then recommend media content items having scores above a threshold value or media content items having the M highest scores to the user.

While FIGS. 6 and 7 illustrate two different systems in which the present invention may be implemented, the present invention is not limited thereto. For example, the present invention may be implemented in a hybrid system. More specifically, in a social recommendation system where user profile matching is utilized to assign weights to recommenders, weights for the recommenders may be assigned at a central server having access to the needed user profiles. Weights for the scoring criteria may be assigned at a user device, which has access to the desired group of media content items to be analyzed such as, for example, the user's media collection. Media content items may then be scored for the user either at the central server or at the user device.

FIG. 8 illustrates a process enabling a user to take an action based on the results of the analysis of FIG. 1 according to one embodiment of the present invention. First, the results of the analysis of the group of media content items with respect to the scoring criteria are presented to the associated user (step 204). In response, the associated user is enabled to interact with the results to take an action such as viewing a list of media content items from the group that satisfy a select criterion or a select combination of criteria from the scoring criteria and/or re-classify media content items (step 206). The user may additionally or alternatively be enabled to take other actions such as initiating playback of media content items satisfying one or more of the scoring criteria, initiating creation of a playlist including media content items satisfying one or more of the scoring criteria, or the like.

FIG. 9 illustrates the process of FIG. 8 with respect to the exemplary GUI 10. In this example, the block 36 is a button 36. In response to activating the button 36, a listing 190 is presented to the user. The listing 190 is a list of all media content items in the group of media content items analyzed that satisfy the associated scoring criterion, which in this case is the Alternative music genre. The user may further be enabled to re-classify the media content items in the listing 190 into another music genre. For example, by selecting a media content item in the listing 190, a listing of music genres 192 is presented to the user. In this example, the current music genre in which the media content item is classified is presented in bold font. The user may re-classify the selected media content item into another music genre by selecting another music genre from the listing of music genres 192. A similar mechanism may be used to re-classify media content items with respect to other scoring criteria such as, for example, decades.

Note that while the process of FIGS. 8 and 9 has been discussed as being in addition to assigning weights to the scoring criteria for the scoring process, the present invention is not limited thereto. More specifically, a group of media content items may be analyzed with respect to criteria, which may or may not be utilized for scoring media content items. The results of the analysis may then be presented to the associated user. The associated user may then be enabled to take some action such as viewing a listing of media content items from the group that satisfy a select criteria or a select combination of criteria. The user may additionally or alternatively be enabled to take other actions such as initiating playback of media content items satisfying one or more of the criteria, initiating creation of a playlist including media content items satisfying one or more of the criteria, or the like.

Those skilled in the art will recognize improvements and modifications to the preferred embodiments of the present invention. All such improvements and modifications are considered within the scope of the concepts disclosed herein and the claims that follow.

What is claimed is:

1. A method performed on a computer, comprising:
defining a plurality of criteria;
analyzing, by the computer, a group of media content items with respect to the plurality of criteria to determine a number of media content items that satisfy each of the plurality of criteria to provide analysis results;
programmatically assigning weights to the plurality of criteria as a function of the analysis results, wherein the weights are normalized according to the criteria having the greatest number or percentage of media content items; and
scoring at least one media content item as a function of the weights assigned to the plurality of criteria.

2. The method of claim 1, wherein the group of media content items are associated with a profile, the weights are programmatically assigned to the plurality of criteria for the profile as a function of the analysis results, and the at least one media content item is scored as a function of the weights assigned to the plurality of criteria for the profile.

3. The method of claim 1, further comprising: adjusting the weights assigned to the plurality of criteria before the scoring of the at least one media content item.

4. The method of claim 1, further comprising: receiving a plurality of recommendations from a social recommendation system, wherein the recommendations identify the group of media content items; wherein scoring the at least one media content item comprises scoring the group of media content items identified by the plurality of recommendations as a function of the weights assigned to the plurality of criteria to provide scores for the group of media content items.

5. The method of claim 1, wherein scoring the at least one media content item comprises scoring a plurality of media content items from a media distribution service to provide scores for the plurality of media content items, and the method further comprising: identifying at least one media content item to recommend from the plurality of media content items available based on the scores; and recommending the at least one media content item.

6. The method of claim 1, wherein the group of media content items comprises a plurality of media content items identified by at least one playlist.

7. The method of claim 1, wherein the group of media content items comprises a plurality of media content items previously obtained from a media distribution service.

8. The method of claim 1, wherein the group of media content items are associated with a profile and the analysis results are indicative of a relevancy of each of the plurality of criteria to the profile, and programmatically assigning the weights to the plurality of criteria as a function of the analysis results comprises: assigning a maximum weight as the weight for a first criterion from the plurality of criteria having a greatest relevancy to the profile; and determining the weights for at least one remaining criterion from the plurality of criteria as a function of the relevancy of the at least one remaining criterion to the profile as compared with the relevancy of the first criterion to the profile.

9. The method of claim 1, wherein the group of media content items includes movies.

10. The method of claim 1, wherein the group of media content items includes songs.

11. The method of claim 1, wherein the plurality of criteria includes time periods.

12. The method of claim 1, wherein the plurality of criteria includes genre.

13. The method of claim 1, wherein the plurality of criteria includes recommendations received from a social network.

14. The method of claim 1, wherein scoring the at least one media content item comprises scoring a plurality of media content items in a playlist of the profile as a function of the weights assigned to the plurality of criteria to provide scores for the plurality of media content items in the playlist.

15. The method of claim 14, further comprising: transmitting at least one media content item based on the scoring.

16. The method of claim 1, wherein the plurality of criteria includes a source of the media content items.

17. The method of claim 16, wherein the source of the media content items includes a subscription service.

18. A method performed on a computer comprising:
defining on the computer a plurality of criteria;
programmatically assigning weights to the plurality of criteria based on a degree of similarity between a plurality of profiles, wherein the weights are normalized according to the criteria having the greatest number or percentage of media content items; and
scoring at least one media content item as a function of the weights assigned to the plurality of criteria.

19. The method of claim 18, wherein the degree of similarity may be determined as a function of matching parameters between the plurality of profiles.

20. A method performed on a computer comprising:
defining on the computer a plurality of criteria;
programmatically assigning weights to the plurality of criteria as a function of a total number of media content items received from a recommender as compared to a number of recommended media content items that have been played, wherein the weights are normalized according to the criteria having the greatest number or percentage of media content items; and
scoring at least one media content item as a function of the weights assigned to the plurality of criteria.

21. A method performed on a computer comprising:
defining on the computer a plurality of criteria;
analyzing a group of media content items with respect to the plurality of criteria to determine a percentage of media content items that satisfy each of the plurality of criteria to provide analysis results;
programmatically assigning weights to the plurality of criteria as a function of the analysis results, wherein the weights are normalized according to the criteria having the greatest number or percentage of media content items; and
scoring at least one media content item as a function of the weights assigned to the plurality of criteria.

22. A method performed on a computer comprising:
defining on the computer a plurality of criteria;
analyzing a group of media content items with respect to the plurality of criteria to determine a number of media content items that satisfy each of the plurality of criteria to provide analysis results;
programmatically assigning weights to the plurality of criteria as a function of the analysis results, wherein the weights are normalized according to the criteria having the greatest number or percentage of media content items;
scoring at least one media content item as a function of the weights assigned to the plurality of criteria; and
recommending at least one media content item based on the scoring.

23. A method performed on a computer comprising:
defining on the computer a plurality of criteria, wherein the plurality of criteria include recommender and source;
analyzing a group of media content items with respect to the plurality of criteria to determine a number of media content items that satisfy each of the plurality of criteria to provide analysis results;
programmatically assigning weights to the plurality of criteria as a function of the analysis results, wherein the weights are normalized according to the criteria having the greatest number or percentage of media content items;
scoring at least one media content item as a function of the weights assigned to the plurality of criteria; and
sorting songs in a playlist based on the scoring of the at least one media item.

24. The method of claim 23, wherein the source is a social network.

25. A system comprising:
a processor in communication with a memory, the processor configured to execute a plurality of computer program modules, the memory including the plurality of computer program modules executable on the processor, the computer program modules including:
a weight assignment function adapted to:
analyze a group of media content items with respect to a plurality of criteria to determine a number of media content items that satisfy each of the plurality of criteria to provide analysis results;
programmatically assign weights to the plurality of criteria as a function of the analysis results, wherein the weights are normalized according to the criteria having the greatest number or percentage of media content items; and
score at least one media content item as a function of the weights assigned to the plurality of criteria.

26. The system of claim 25, wherein the system comprises a server, and the weight assignment and the scoring are implemented on the server.

27. The system of claim 25, wherein the system comprises a device, and the weight assignment and the scoring are implemented on the device.

28. A non-transitory computer readable medium comprising software with instructions to:
analyze a group of media content items with respect to a plurality of criteria to determine a number of media content items that satisfy each of the plurality of criteria to provide analysis results;
programmatically assign weights to the plurality of criteria as a function of the analysis results, wherein the weights are normalized according to the criteria having the greatest number or percentage of media content items; and
score at least one media content item as a function of the weights assigned to the plurality of criteria.

* * * * *